United States Patent [19]

Risberg

[11] 4,054,818
[45] Oct. 18, 1977

[54] SOLID STATE CURRENT SOURCE POLYPHASE INVERTER INDUCTION MOTOR DRIVE

[76] Inventor: Robert L. Risberg, 16915 W. Judith Lane, Brookfield, Wis. 53005

[21] Appl. No.: 624,016

[22] Filed: Oct. 20, 1975

[51] Int. Cl.$^2$ .............................................. H02P 5/40
[52] U.S. Cl. .................... 318/227; 318/230; 318/231; 363/138
[58] Field of Search ....................... 318/227, 230, 231; 321/45 C

[56] References Cited

U.S. PATENT DOCUMENTS

| | | | |
|---|---|---|---|
| 3,694,727 | 9/1972 | Seki | 321/45 C X |
| 3,815,003 | 6/1974 | Wiart | 318/227 X |
| 3,825,813 | 7/1974 | Wirtz | 321/45 C X |
| 3,906,314 | 9/1975 | Wiart | 318/227 X |

Primary Examiner—Gene Z. Rubinson
Attorney, Agent, or Firm—Sughrue, Rothwell, Mion, Zinn and Macpeak

[57] ABSTRACT

A solid state, current source, polyphase inverter induction motor drive is disclosed wherein the current source is derived from a constant potential buss. Each side of the buss is connected to the inverter via a separate chopper. The choppers normally operate in unison to supply a controlled current to the inverter. Each time the inverter sequence is to be advanced, the chopper current is reduced to zero on the side of the inverter, either positive or negative, that requires a commutation. Chopper current is then reinstigated and feeds the next set of inverter thyristors in the inverter sequence. Alternative means for rendering the current source non-inductive during inverter commutations, and transformerless means for providing motor voltages well above rated voltage are also disclosed.

11 Claims, 8 Drawing Figures

TYPICAL LINE CURRENT OUTPUT, VARIABLE FREQUENCY

VARIABLE FREQUENCY

CONSTANT FREQUENCY

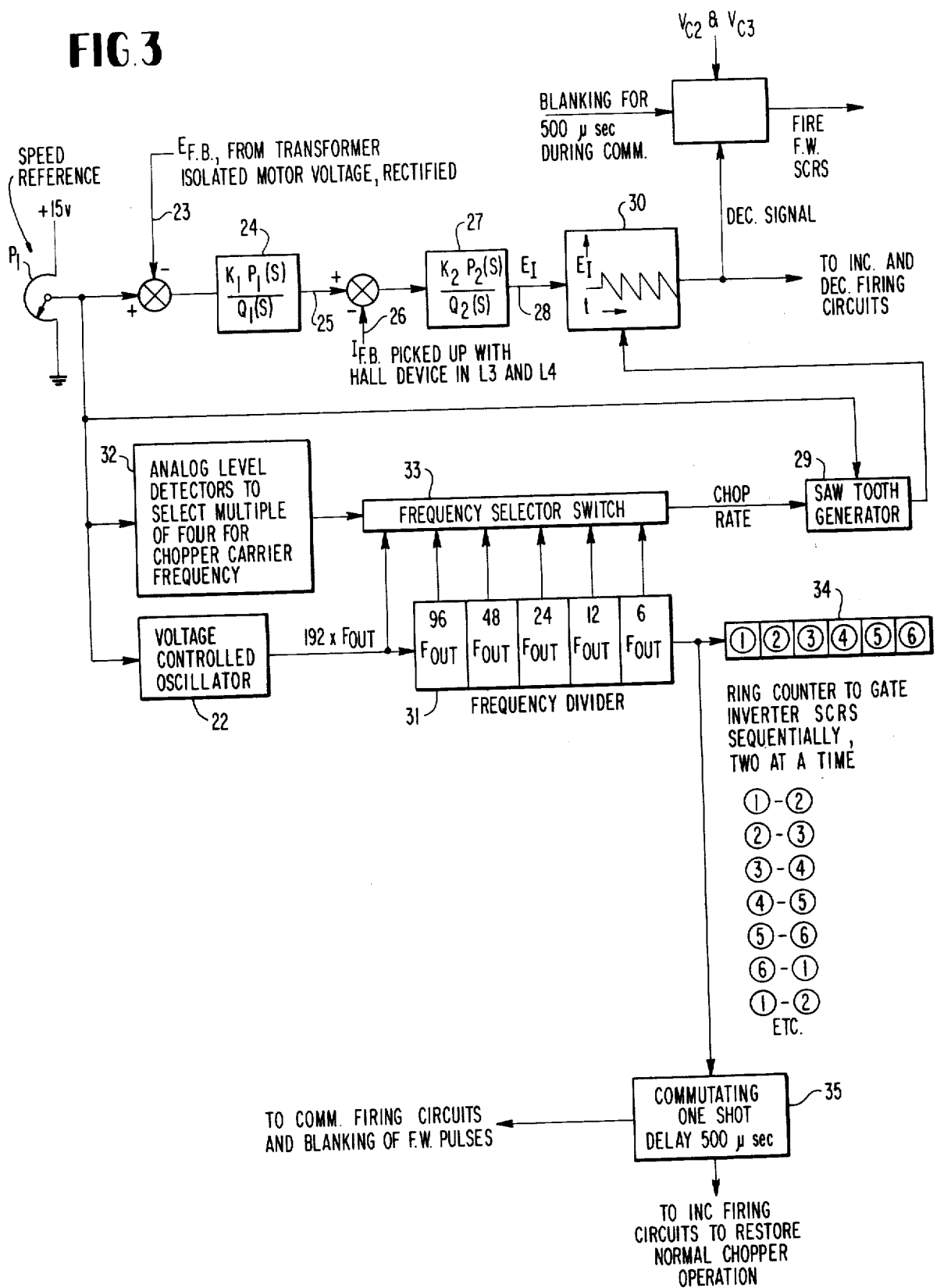

1

SOLID STATE CURRENT SOURCE POLYPHASE INVERTER INDUCTION MOTOR DRIVE

BACKGROUND OF THE INVENTION

1. Field of the Invention

The invention generally relates to current source inverters for induction motor control, and more particularly, to an adjustable speed polyphase induction motor drive.

2. Description of the Prior Art

Current source inverters for induction motor control are well known in the prior art. See, for example, the patent to Mittag, U.S. Pat. No. 1,946,292. Polyphase inverters, as exemplified by the Mittag patent, are forced commutated inverters of the capacitive coupled type, employing blocking diodes to trap peak voltage on the capacitors. This concept has been employed very seldom during the succeeding years primarily because of the high cost, poor efficiency, and low reliability of thyratron switches.

Prior art current source inverters customarily have a polyphase diode bridge rectifier connected to the motor terminals to serve as a clamp during inverter commutations. The D.C. side of this rectifier has an electrolytic capacitor bank to accept the energy contained in the inductive component of motor current, and a resistor or other means to bleed off this energy between commutations.

Specifically, the leakage reactance field energy is transferred to the clamp upon commutation of motor current from one line to another.

Conventional current source inverters also have the disadvantage of low power factor when supplying an induction motor. This is due to the fact that total output current must be drawn from the input lines on a one-to-one basis. In these prior art systems D.C. input current to the inverter is controlled by phase control of a controlled bridge rectifier connected on its D.C. side to the inverter via a D.C. inductor. At no load, the magnetizing current of the motor is drawn from the input lines at zero power factor, and throughout the range of load and speed of variable frequency operation, all lagging or reactive KVA at the load is drawn from the input lines as such.

Another problem inherent in conventional current source inverters is that the ripple voltage present on the output of the controlled bridge rectifier periodically adds and subtracts from the ripple generated on the D.C. link by the inverter. This creates beats and large ripple at low frequency when the variable frequency output is close to the line frequency or a multiple of the line frequency. This large, low frequency ripple current creates torque disturbances and affects motor stability adversely.

SUMMARY OF THE INVENTION

It is therefore an object of the invention to provide a low cost adjustable speed induction motor drive.

It is another object of the invention to provide a highly efficient, solid state, high power factor induction motor drive which is both inexpensive to manufacture and to operate.

It is a further object of the invention to provide a current source inverter which can sustain a fault in its output, or of any component in the inverter or in either of two choppers without drawing current above a predetermined limit.

It is a specific object of the invention to provide a polyphase current source inverter wherein only two thyristors must be the gold doped, fast turn off time type, all others being low cost, low forward voltage drop thyristors normally employed for phase control rectifier applications.

The foregoing and other objects of the invention are attained by providing a solid state polyphase current source inverter having a constant voltage D.C. buss as a power supply. Chopper controlled current sources are derived from the D.C. buss. The chopper provides the inverter commutating requirement and functions also as the current amplitude control means.

In the present invention the D.C. buss capacitor bank accepts leakage reactance field energy transferred to it by the motor during inverter commutation, and allows this energy to be reused rather than dissipated. The D.C. buss capacitor bank also serves as a low transient impedance for the current chopper which alternately draws current from the buss and then freewheels. The operation of the chopper provides a smooth current output from the chopper even though the chopper draws discontinuous current from the buss.

The frequency of chopping is a predetermined multiple of output frequency, said multiple changing automatically from a high multiple at a low output frequency to a relatively low multiple at high output frequency, so as to maintain a chopping rate in the range of several hundred to a thousand chops per second. By chopping at a multiple of output frequency, current and voltage ripple created by the chopper are automatically synchronous with the ripple created by the inverter, precluding low frequency beats and attendant problems.

BRIEF DESCRIPTION OF THE DRAWINGS

The specific nature of the invention, as well as other objects, aspects, uses and advantages thereof, will clearly appear from the following description and from the accompanying drawings, in which:

FIG. 3 is a schematic and block diagram of the logic and feedback control circuitry for generating the analog and switching signals for control of the various switching devices used in the motor drive circuit of FIG. 2.

DESCRIPTION OF THE PREFERRED EMBODIMENTS

Figure 1:
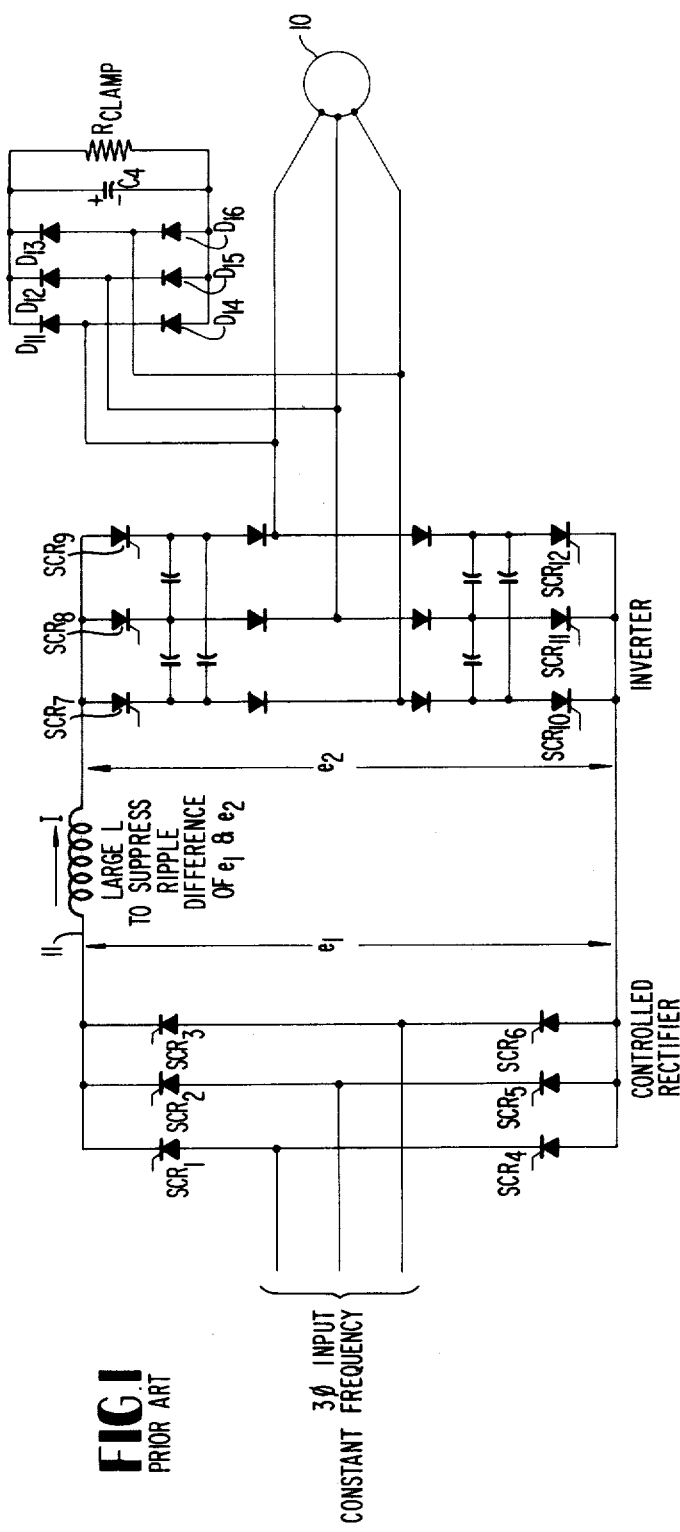
FIG. 1 is a schematic diagram of a prior art current source polyphase inverter induction motor drive.
Figure 1C:
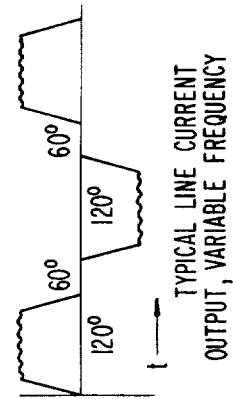
FIGS. 1A, 1B and 1C are waveform diagrams illustrating the operation of the prior art induction motor drive shown in FIG. 1.
Figure 1B:
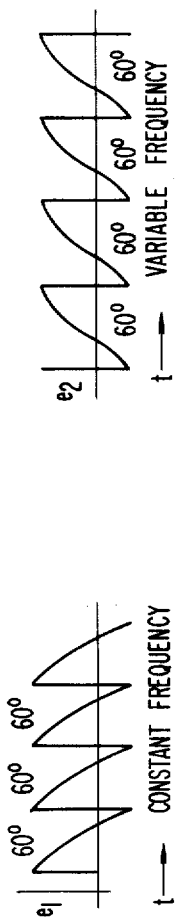
Figure 1A:
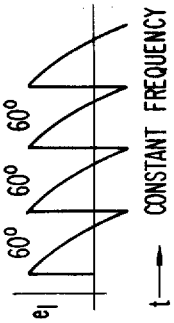

Referring now to the drawings, and more particularly, to FIG. 1 thereof, a conventional current source inverter for a three-phase induction motor 10 is illustrated. The three-phase A.C. line voltage is rectified by a controlled rectifier bridge $SCR_1$ to $SCR_6$ to produce an output rectified D.C. voltage with constant frequency ripple as shown in FIG. 1A. A large inductance L is connected in series with the positive buss 11 and the inverter section to minimize ripple current generated by the constant frequency ripple voltage of the controlled rectifier bridge and the variable frequency ripple voltage from the inverter section. The ripple voltage of the inverter is shown in FIG. 1B. The inverter section comprises $SCR_7$ to $SCR_{12}$ in a bridge configuration with associated commutating capacitors and diodes. A clamp comprising diodes $D_{11}$ to $D_{16}$, capacitor C4 and resistor R is connected across the motor 10 leads from the inverter section. The output voltage to motor 10 is shown in FIG. 1C.

Figure 2:
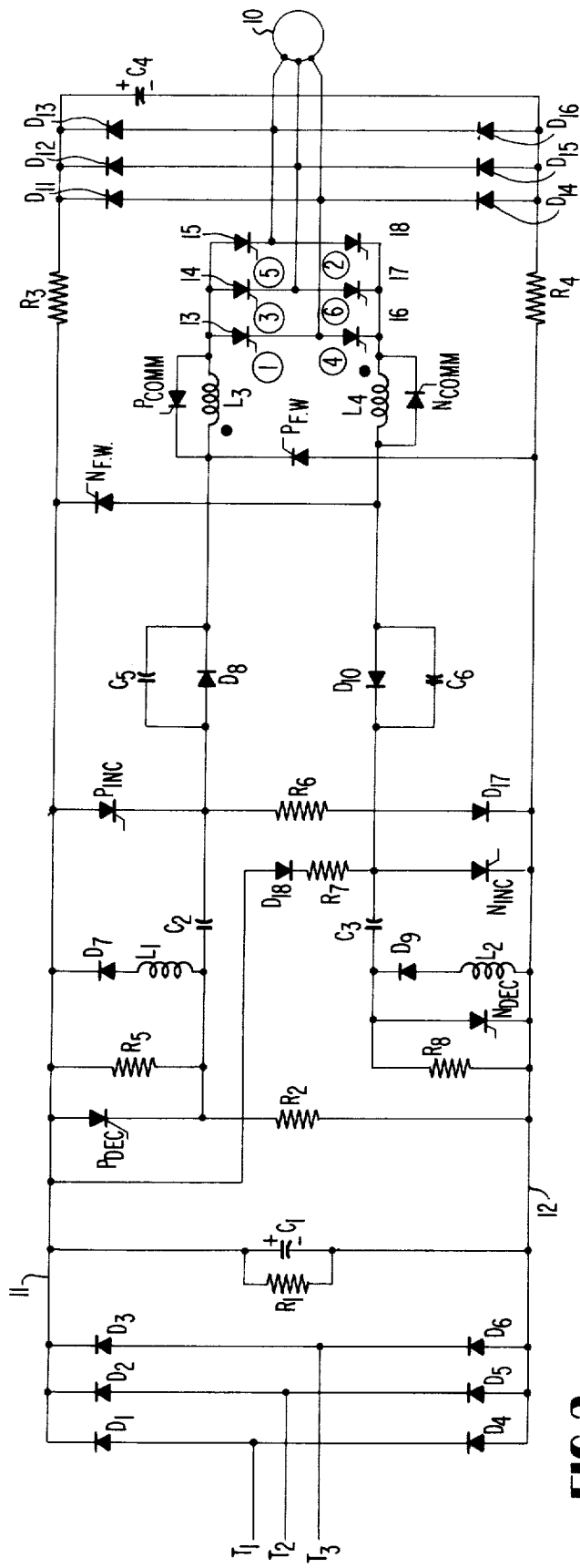
FIG. 2 is a schematic diagram of the solid state current source polyphase inverter induction motor drive according to a preferred embodiment of the invention.

The motor drive according to the invention is shown in FIG. 2 wherein like reference numerals represent corresponding parts shown in the conventional circuit of FIG. 1. In FIG. 2, a three-phase A.C. line voltage supply is connected to input terminals T1, T2 and T3. The three-phase line voltage is rectified by a diode bridge rectifier circuit comprising diodes D1 to D6 to create a constant voltage positive and negative buss 11 and 12, respectively. An electrolytic capacitor bank represented by C1 is connected across the buss and charged to buss voltage.

The capacitor C1 acts as a low impedance source, allowing the choppers to draw current on a discontinuous basis without generating voltage transients, and also acts as a sump to receive reactive motor current following inverter commutation. Resistor R1 connected in parallel with C1 and having a high value of resistance is simply a discharge means for the capacitor when the A.C. line is disconnected.

A positive chopper comprises of positive increase $P_{inc}$SCR, positive decrease $P_{dec}$SCR, $C_2$, $L_1$, $D_7$, $D_8$, and positive freewheeling $P_{FW}$ SCR control the connection and disconnection of the dotted terminal of $L_3$ to the positive buss. Similarly, a negative chopper comprised of negative increase $N_{inc}$ SCR, negative decrease $N_{dec}$ SCR, C3, L2, D9, D10 and negative freewheeling $N_{FW}$SCR connect and disconnect the undotted end of L4 to the negative buss 12. When the increase SCRs $P_{inc}$ and $N_{inc}$ are on, the current will increase; when the decrease SCRs $P_{dec}$ and $N_{dec}$ turn off the increase SCRs, current will flow through the freewheeling SCRs $P_{F.W.}$ and $N_{F.W.}$, and the direction of current flow will be the same through L3 and L4 but will decrease in value.

The switching rate of the choppers will be a multiple of output frequency, and said multiple will automatically change at preselected points in the output frequency range. For example, from 2 hertz to 5 hertz the chopping frequency will be 192 times output frequency $f_{out}$, or 386 to 965 hertz. The multiple will change and be 96 times $f_{out}$ from 5 hertz to 10 hertz, etc. The amplitude of the current is controlled by varying the percent of time in the increase state per chopping period. This follows conventional practice.

The operation of the power circuit is as follows. Capacitors C2 and C3 are charged via R5, R6 and D17, and D18, R7 and R8, respectively. At this point, $P_{inc}$ and $N_{inc}$ are fired. The charge on C2 and C3 is reversed by their discharge through L1, D7 and L2, D9, respectively. This reverse charge is trapped by D7 and D9. R5, R6, R7, R8 have very high resistance values and will not bleed an appreciable charge off C2 and C3 during the few milliseconds the increase SCRs $P_{inc}$ and $N_{inc}$ are on. While the increase SCRs $P_{inc}$ and $N_{inc}$ are on, current will build up through L3 and L4. L3 and L4 are relatively large inductors that can be wound on separate cores or on a mutual core. Their inductance is sufficiently large to smooth the current flowing through them to a D.C. current with a few percent ripple.

When the decrease SCRs $P_{dec}$ and $N_{dec}$ are fired, C2 and C3 are discharged into L3 and L4. L3 and L4 are so large, however, that the discharge of C2 and C3 will essentially be constant current equal to the current that had been established in L3 and L4 during conduction of the increase SCRs $P_{inc}$ and $N_{inc}$. Increase SCRs $P_{inc}$ and $N_{inc}$ will be reverse biased by a value of voltage equal to the voltage on C2, C3 when the decrease SCRs $P_{dec}$ and $N_{dec}$ are fired. This turns off SCRs $P_{inc}$ and $N_{inc}$. The voltage on C2 and C3 will decrease linearly at a rate determined by the current in L3 and L4, and thus will become charged to the opposite polarity via the decrease SCRs $P_{dec}$ and $N_{dec}$ and L3 and L4.

When C2 and C3 have reached a charge equal to the D.C. buss potential, the cathode of SCR $P_{inc}$ will have fallen to the negative buss 12 potential and the anode of the SCr $N_{inc}$ will have reached the potential of the positive buss 11. At this point, the freewheeling SCRs $P_{F.W.}$ and $N_{F.W.}$ can be fired and current will flow through them and cease flowing through the decrease SCRs $P_{dec}$ and $N_{dec}$. Hence, current through L3 and thence out of one of the positive inverter SCRs 13, 14 or 15 to the motor 10 and back through another motor lead to a negative inverter SCR 16, 17 or 18 to L4 will continue to flow through the freewheeling SCRs $P_{F.W.}$ and $N_{F.W.}$ and neither the increase or decrease SCRs $P_{inc}$, $N_{inc}$, and $P_{dec}$, $N_{dec}$ will carry current.

L3 and L4 and the motor 10 must discharge into the constant potential buss 11 and 12 via the freewheeling SCRs $P_{F.W.}$ and $N_{F.W.}$, and this, of course, will cause the current to decrease. Periodically, at the chopper frequency, the increase SCRs $P_{inc}$ and $N_{inc}$ will be refired. C2 and C3 will ring around their charge via $L_1$, $D_7$ and $L_2$, $D_9$ in a hundred microseconds and then, a few milliseconds later, the decrease SCRs $P_{dec}$ and $N_{dec}$ will be fired discharging C2 and C3 into L3 and L4, and C2 and C3 will be recharged to their initial potential in a few tens of microseconds, freewheeling SCRs $P_{F.W.}$ and $N_{F.W.}$ will again be fired, etc.

As described earlier, the current can be controlled by varying the percentage of time in increase state versus the decrease state during the period of the chopping frequency. This will vary from 90% of the chopping in the increase state and 10% in the decrease and freewheeling states, to 10% in the increase state and 90% in the decrease and freewheeling states. Complete control of the amplitude of current through L3 and L4 and, therefore, to the motor 10 is thus attained.

In a current source inverter, as in a controlled rectifier bridge, only one positive inverter SCR and one negative inverter SCR carry current at a time, for example SCRs 13 and 18. When it is desired to advance the inverter firing order to 18 and 14 (such advancement is what constitutes the output frequency to the motor), the current to the inverter is interrupted. L3 and L4 are too large an inductance, because of their main purpose which is to provide a smooth D.C. current, to permit reducing their current to zero in the time allotted for inverter commutation. Therefore, those inductances are rendered non-inductive by firing the commutating SCRs $P_{comm}$ and $N_{comm}$ in parallel with L3 and L4.

The chopping frequency is a multiple of the inverter sequence frequency and, therefore, the chopper will always be in a known state of its operation when the sequence advance signal arrives for the inverter. To wit, the chopper period always begins with a mandatory decrease, and somewhere later in the period, the increase SCRs $P_{inc}$ and $N_{inc}$ will be fired, then a new period begins with a decrease, etc. The inverter advancement signal is simply a counted down submultiple of the chopper frequency, and arrives, for example, upon every 24th chopper decrease signal. Hence, we say the chopper is chopping at a multiple of the inverter, when in fact it is synonymously the other way around, the inverter is a quotient of the chopping frequency.

The chopper is, therefore, always about to begin a decrease operation when the inverter sequence advance signal arrives. The decrease is blanked, and a 100 microsecond "per comm. Inc.$_{off}$" fires the Inc SCRs to ensure that the F. W. SCRs are turned off. Then a "comm." pulse fires the Dec SCR on the side corresponding to the side of the inverter requiring commutation. The other chopper is left in Inc. when the commutating capacitor of the chopper put into Dec by the comm. pulse is charged to buss potential by the large inductor the comm SCR, either $P_{comm}$ or $N_{comm}$, will be fired. Hence one side of the inverter will be starved for current, while the other side will continue to carry current. Specifically, the side with the comm SCR fired will not be feeding the inverter because the comm SCR renders that inductor non-inductive, and the capacitor on that chopper is charged to buss potential. Current can no longer flow to the inverter on the side affected by the comm. pulse.

Actually the comm SCR is deliberately not gated on until L3 or L4 have charged C2 or C3 to a voltage somewhat higher than the buss. This is to allow the small capacitors C5 or C6 in shunt with blocking diodes D8 or D10, respectively, to sweep charge out of the inverter SCRs 13 to 18 when $P_{comm}$ or $N_{comm}$ are fired. This occurs because until the commutating SCRs $P_{comm}$ and $N_{comm}$ are fired, current had been flowing through a positive and a negative inverter SCR. With a voltage on C2 or C3 substantially higher than the D.C. buss or the clamp, the sudden elimination of the previously induced voltage in L3 or L4 will cause C2 or C3 to try to discharge their excess charge to the D.C. buss 11 and 12 via D7, L1, C5, reverse current in the positive inverter SCR, or C6, L2 and D9 and the negative inverter SCR. Such sweep out of charge in the inverter SCR that had been conducting is desirable since it assists the SCR in regaining its blocking characteristic.

The next inverter sequence advance signal will initiate current interrupt on the opposite side of the inverter to permit commutation.

The inverter SCRs do not need to have gold doping to gain short turn off time because the chopper interrupt of current can be arbitrarily long. For example, gold doped SCRs require approximately 30 microseconds time and a reverse voltage to assure they will stay off. Non-gold doped, so-called phase controlled rectifier SCRs may require 300 microseconds to turn off reliably. However, with the circuit described, once the inverter current is interrupted on the side to be commutated and C5 or C2 sweep out the charge, the inverter SCRs will remain with a reverse voltage applied as long as desired with no additional cost whatsoever. To date, no SCR has been found that would not recover its blocking state within 150 $\mu$sec, and therefore, 300 to 500 $\mu$sec have been provided as a very generous safety factor.

The only devices needing a short turn off time are the increase SCRs $P_{inc}$ and $N_{inc}$. The decrease SCRs $P_{dec}$ and $N_{dec}$ have a long time to recover naturally since C2 and C3 cannot pass D.C. current. The freewheeling SCRs $P_{F.W.}$ and $N_{F.W.}$ get a long turn off when the increase SCRs are fired. Following commutation, the new inverter SCRs are gated, and the first increase state will provide the commutating SCRs $P_{comm}$ and $N_{comm}$ with a long reverse voltage turn off time. Even the increase SCRs do not have to have very short turn off times, since the discharge of C2 and C3 is a constant current discharge at a rate determined by the load current. The discharges of C2 and C3 into L3 and L4, respectively, do not involve a resonant circuit pulse of high amplitude that is characteristic of many commutating circuits. Moreover, the energy on C2 and C3 that is delivered to L3 and L4 is put to good use, since it is a load current. Hence, the commutation is very efficient.

Figure 2A:
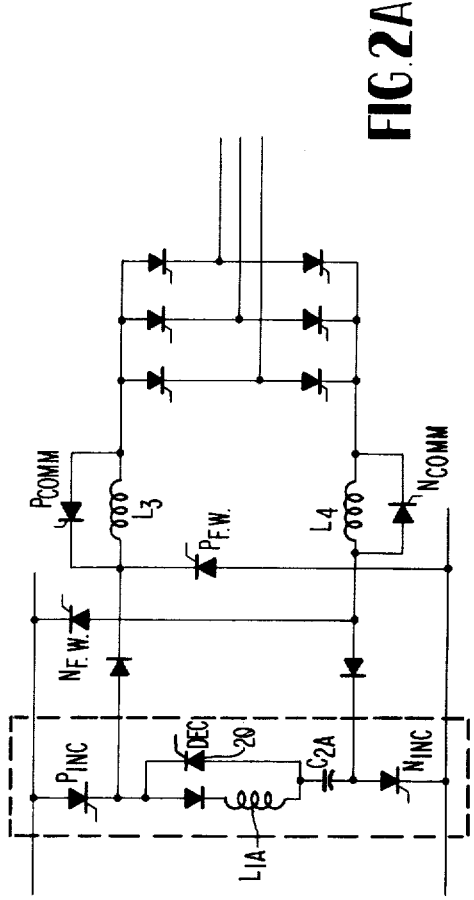
FIG. 2A is an alternative hopper commutation circuit.

A variation of the chopper circuit is shown in FIG. 2A. Here, a single decrease SCR 20 turns off both increase SCRs $P_{inc}$ and $N_{inc}$. C2A is charged to approximately twice buss voltage when the increase SCRs are fired, and then C2A discharges into L3 and L4 when decrease SCR 20 is fired. C2A is allowed to reverse charge a predetermined amount before the freewheeling SCRs $P_{F.W.}$ and $N_{F.W.}$ are fired to insure that with said reverse voltage present on C2A when the increase SCRs are fired, twice buss voltage will be assured by resonant charging via L1A.

Although the number of parts is less with this circuit, the voltages are quite high on a 60 V. D.C. buss, and the complete redundancy of two choppers during a fault, which is present in the preferred embodiment, is lost. For example, in the preferred embodiment, nearly any component failure can occur without creating a fault on the D.C. buss because at least one side of the buss will be protected by an operational chopper.

As previously described, the percent on time of increase during a period of the chopper frequency can be carried. The D.C. voltage appearing across the inverter section, from the anodes of inverter SCRs 13, 14 and 15 to the cathodes of inverter SCRs 16, 17 and 18, is a function of load power factor and load voltage expressed as follows:

$$E_{D.C.\ inverter} = E_{A.C.\ motor} \times \cos \beta$$

where $\cos \beta$ is the power factor and $\beta$ is the angle between the fundamental component of motor current and motor voltage. The power factor will vary from zero at no load to 0.8 at full load.

When the increase SCRs are on, the forcing voltage across L3 and L4 is $E_{D.C.\ buss} - E_{D.C.\ inverter}$ and will always be a positive voltage, causing the current to increase. When the decrease SCRs are fired, and 100$\mu$ seconds later the freewheeling SCRs conduct, the voltage induced by L3 and L4 will be $-E_{D.C.\ inverter} - E_{D.C.\ buss}$, and will always be negative, causing the current to decrease.

When an overhauling load exists on the motor, the power factor becomes negative, and a negative voltage appears across the D.C. side of the inverter. The increase forcing voltage on L3, L4 is then $E_{D.C.\ buss} + E_{D.C.\ inverter}$ and the voltage during freewheeling SCR conduction following the conduction of the decrease SCRs is $+E_{D.C.\ inverter} - E_{D.C.\ buss}$. Since $E_{D.C.\ inverter}$ will always be less than $E_{D.C.\ buss}$ in absolute magnitude, current is always controllable. However, in regeneration, the percent time on in the increase state will be shortened, and the percent time in freewheeling will be lengthened because over a full chopping cycle the volt seconds across L3 and L4 must be equal. Moreover, a resistive path must be introduced across the D.C. buss to dissipate the energy transferred to the buss by the overhauling load. This requirement can be seen from the fact that the essentially smooth constant current in L3, L4 spends a longer period of time pumping into the buss via the freewheeling SCRs than it does drawing current from the buss via the increase SCRs. Such a resistive path $R_2$ is shown in series with SCRs $P_{dec}$ and DB. When SCR $P_{dec}$ is turned off by the action of increase discharging $C_2$ through $L_1$ and $D_7$, SCR DB will also be turned off since it depends on SCR $P_{dec}$ for current flow. A similar path can be connected to SCR $N_{dec}$ for additional dissipation.

The presence of $R_3$ and $R_4$ creates an IR drop for the current flowing from $C_4$ back into the D.C. buss. $C_4$ is energized to a higher voltage than the D.C. buss each time the inverter is commutated, and motor inductive current is forced to discharge into $C_4$ via clamp diodes D11 through D16. By increasing R3 and R4, the clamp voltage can be made arbitrarily higher than the D.C. buss. The current source constituted by the choppers and L3, L4 feed the motor voltage times the power factor, and therefore, at full motor voltage equal to the input line voltage, the current source is only serving a D.C. inverter voltage of 80% of the D.C. buss voltage available. If desired, the motor voltage can be increased to $1 \div 0.8$, or 125% of the input line voltage. This allows a constant torque speed range on the motor from 0 to 125% of rated speed. Finally, for minimum cost purposes, R3 and R4 can be made zero, and a top speed of a few percent less than rated speed accepted. Also, for minimum cost, SCRs $P_{comm}$ and $N_{comm}$ can be eliminated, and L3 and L4 would bifilarly on a common core. In this case, during inverter commutation, current is only interrupted on the side of the inverter requiring commutations, for example, when advancing from inverter SCR gates ①②to②③. Only the L3 side needs to be shut off. The SCR $N_{inc}$ conducts continuously during a zero current commutation on the opposite side of the inverter. SCRs $P_{inc}$, $P_{dec}$ and $P_{F.W.}$ are left off following operation of SCr $P_{dec}$. The current in L3 is transferred to L4 easily because of the tight bifilar coupling in this low cost case. Hence, a current equal to twice what had been flowing in L4 prior to commutation will flow in L4 during commutation, and will freewheel through SCR $N_{inc}$, a negative side clamp diode, and whichever negative side inverter SCR is on, 18 in the example cited. In addition to eliminating SCRs $P_{comm}$ and $N_{comm}$, the single commutating circuit of FIG. 2A can be used when no overhauling loads occur.

FIG. 3 shows the closed loop operation of the system and follows conventional practice. A voltage reference pot $P_1$, which is roughly analogous to a speed reference, serves as the master reference for a voltage regulator 24 and for a voltage controlled oscillator 22.

The A.C. motor terminal voltage is isolated with a signal transformer and rectified to provide a D.C. feedback voltage on line 23. A voltage regulator 24 compares the reference and feedback voltage and filters the difference, usually with a lead/lag network. The output at the voltage regulator 24 is used as a current reference signal on line 25. The current in L3 and L4 is picked up with a Hall device and constitutes $I_{F.B.}$ on line 26. $I_{ref}$ and $I_{F.B.}$ are compared in a current regulator 27 and the difference is filtered, again usually with a lead/lag network. The output on line 28 is a smooth signal called $E_I$. A sawtooth signal with a repetition rate equal to the chopping frequency from sawtooth generator 29 is compared with $E_I$ in comparator 30. When the sawtooth signal undershoots $E_I$, the increase SCRs are fired, and when the sawtooth is greater than $E_I$, the decrease SCRs are fired. The system thus far described is a conventional phase control regulator with a carrier frequency equal to the chopping frequency selected.

In parallel with the voltage regulator, a voltage controlled oscillator 22 provides an output frequency proportional to the reference potentiometer $P_1$ setting. This is typically at a frequency much higher than the output frequency desired at the motor 10 and is divided by a multi-stage counter or frequency divider 31. A set of analog voltage level detectors 32, with slight hysteresis to avoid flutter, are tripped at preselected levels as the reference pot $P_1$ is advanced. These level detectors select, via frequency selector switch 33, which stage of the counted down voltage controlled oscillator 22 frequency should be selected as the chopper frequency. The selected chopper frequency then controls the frequency of sawtooth generator 29. The amplitude of the sawtooth generator 29 output is held constant by using the reference voltage from $P_1$ to establish a charging rate to a capacitor in the sawtooth generator. The sawtooth generator output is then the basis of a phase control current regulator previously described.

The final stage of the frequency counter-divider 31 is six times the desired output frequency. This frequency is then counted down by a shift register or ring counter 34 with two sequential active stages, such as ①②②③, etc. The two active stages are fed to the firing circuits of the corresponding inverter SCRs. Each time the inverter is to be advanced a step, a commutating SCR is gated for 500 microseconds and following this delay by one shot 35, the increase SCRs are gated to restore normal chopping operation to the power conversion circuit. The freewheeling SCRs are normally gated after the decrease state when $V_{C2}$ and $V_{C3}$ are fully charged. This signal is blocked or blanked during each inverter commutation.

The above described current interrupt system, while combining the inverter commutation requirement with the chopper commutation apparatus for economic benefit, has the disadvantage of suffering a slight reduction in maximum output voltage due to the interruption in power flow. For example, at 60 hertz output frequency a commutation is required every $1/(6 \times 60)$ sec = 2.78 milliseconds.

If the commutation interrupts last 250 microseconds the output voltage has a maximum value of $(2.78 - 0.25)/2.78 = 91\%$ of what it would be if these interrupts did not occur.

Figure 4:
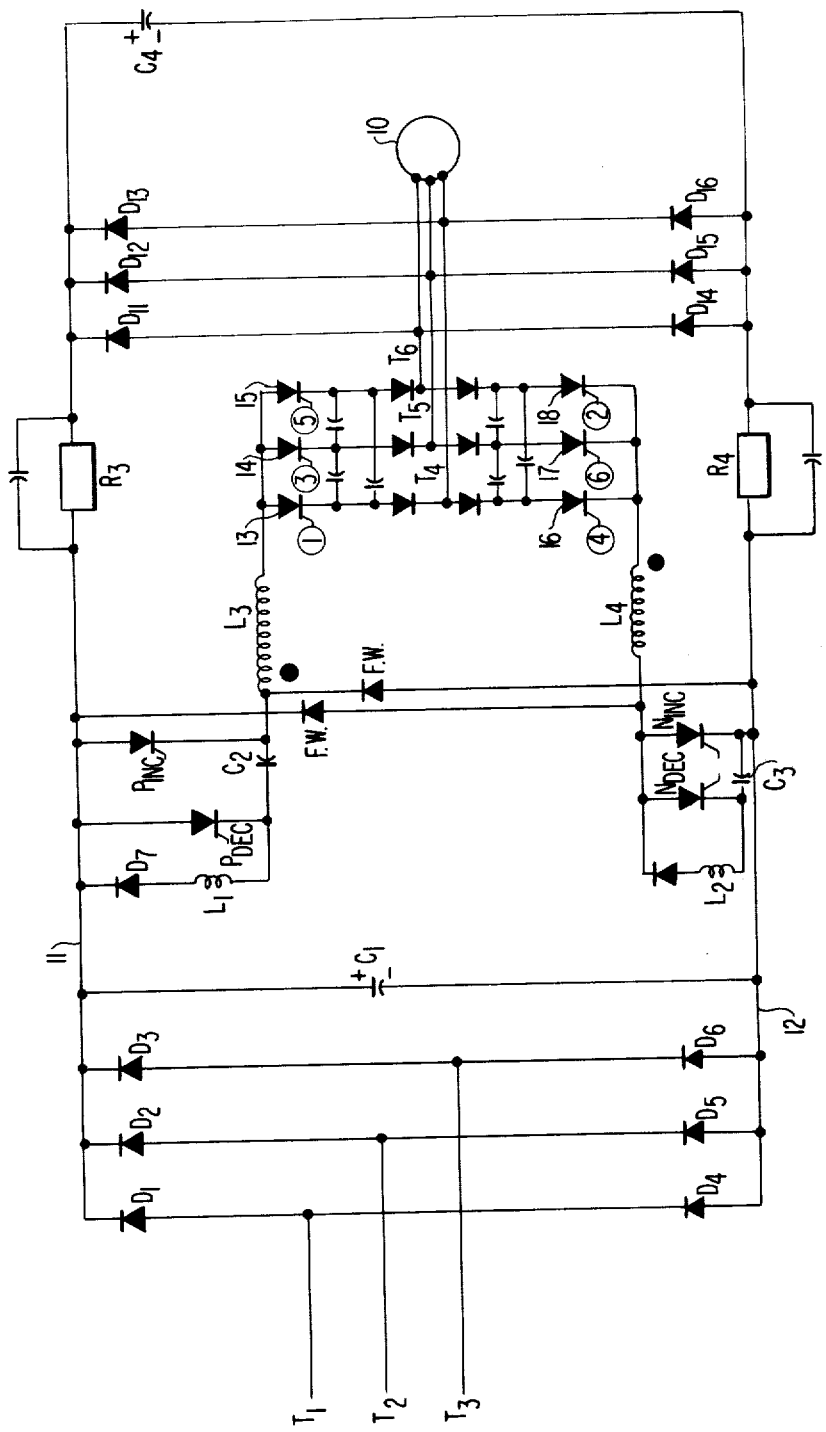
FIG. 4 is a schematic diagram of an alternate, preferred embodiment of the solid state current source polyphase inverter induction motor drive according to the invention.

Consequently, when it is necessary to obtain the highest possible output voltage, without resort to a transformer, the circuit of FIG. 4 can be used.

This circuit performs as the aforedescribed system is all respects except no commutation interrupts occur. The positive and negative choppers operate in unison at all times at a frequency that is a selected multiple of the output frequency, and current flow controlled by automatic on-off duty cycle control of the Inc and Dec SCRs, etc.

In this case the inverter commutations occur as in a conventional current source inverter, by virtue of the capacitors coupling the adjacent SCRs together. For example, if inverter SCRs 13 ad 18 are conducting and the conduction is to transfer SCRs 18 and 14, the capacitors will have been charged such that the positive polarity will be at the cathode of SCR 13 and the negative at SCR 14. Firing SCR 14 will then cause the capacitor between SCRs 14 and 13 to attempt to discharge backwards through SCR 13, turning it off. Current continues to flow out terminal $T_4$ to the motor 10 and the leakage reactance in the $T_4$ phase of the motor will take all of the charge on the capacitor and cause it to be reverse charged until finally the $T_4$ phase leakage reactance spills over a negative clamp diode. The capacitor is then ready for a later commutation. The initial charge to the capacitors is provided by small resistors and diodes connected from the positive and negative busses to the capacitors as described for the chopper commutating capacitors.

From the above, it is obvious that other arrangements of logic and signal control are possible without departing from the scope of the aforedescribed invention.

What is claimed is:

1. A solid state current source, polyphase inverter induction motor drive comprising:
    a. a constant potential D.C. buss including a positive buss and a negative buss;
    b. a polyphase inverter comprising a plurality of thyristor switches supplied from said constant potential D.C. buss and providing polyphase driving current at its output;
    c. clamp means including a plurality of clamp diodes connected to the output of said polyphase inverter; and
    d. controlled current D.C. chopper means interposed between each side of said D.C. buss and said polyphase inverter for controlling the magnitude of current fed from said D.C. buss to said polyphase inverter and for interrupting the current flow to each side of said polyphase inverter for a period of time sufficient to permit said inverter thyristor switches to assume their blocking state prior to refiring a new set of inverter thyristor switches and thereby commutate current from one inverter switch of one phase to an adjacent switch in another phase, said polyphase inverter serving as a steering means for the controlled D.C. current and said chopper means operating to re-establish the desired magnitude of current following a starvation period that insures turn-off of the prior conducting inverter switches, said polyphase inverter being directly commutated only by said chopper.

2. An induction motor drive as recited in claim 1 wherein said polyphase inverter is comprised of two thyristors per phase and two clamp diodes per phase, said clamp diodes connected from the inverter output terminals in a rectifier configuration to a D.C. capacitor tank, and said capacitor tank further connected to said D.C. buss via a first resistive path to said positive buss and a second resistive path to said negative buss.

3. An induction motor drive as recited in claim 1 wherein said controlled current D.C. chopper means is comprised of a first inductive coil, a first electronic switch connected from said positive buss to one end of said first inductive coil, the other end of which is connected to the common anode side of said polyphase inverter, first discharge path means for selectively rendering said first inductive coil non-inductive when said first electronic switch is in the off state, so as to deprive said common anode side of said inverter of current, and second discharge path means for selectively permitting said first inductive coil to remain inductive and allow it to continue supplying current to said inverter even when said first electronic switch connecting said first inductive coil to said positive buss is in the off state, and wherein said chopper is further comprised of a second electronic switch, a second identical complementary inductive coil connecting the common cathode side of said inverter to said negative buss by means of said second electronic switch, said second inductive coil being provided with third and fourth selective discharge path means, said third discharge path means rendering said second inductive coil non-inductive for interrupting current to the common cathode side of said inverter when said second electronic switch connecting said second inductive coil to said negative buss is in the off state, and said fourth discharge path means for allowing said second inductive coil to continue supplying said common cathode of said inverter with current when said second electronic switch is in the off state.

4. An induction motor drive as recited in claim 3 further including control means for controlling said chopper means, said control means comprising:
    a. a voltage controlled oscillator operating at a frequency higher than the desired output frequency but proportional thereto,
    b. multistage counter means for dividing said oscillator frequency into a number of lower frequencies,
    c. shift register means for receiving an output of said counter means and stepping at two times the number of output phases times the inverter output frequency, and containing a number of stages equal to two times the number of phases, two adjacent stages of which being on a time for gating said inverter switches,
    d. automatic frequency selector means for receiving all outputs of said counter means and selecting one of the frequencies available at said multistage counter means as the corresponding frequency establishing the switching rate of said chopper means, such selection being a function of the desired inverter output frequency,
    e. means to enable said first and third discharge path means or alternatively, said first or third discharge path means once of each advancement of said shift register means for a preset period of time,
    f. means to enable said fourth discharge path means at those times when said third discharge path means is not enabled, and second discharge path means when said first discharge path means is not enabled,
    g. a closed loop voltage controlled regulator means for establishing a current reference as a function of voltage error between a reference voltage and the rectified inverter output voltage,
    h. a current regulator means for establishing a current error proportional to the difference between said current reference and a signal proportional to the current in said first and second inductive coils, and
    i. means for comparing said current error with a sawtooth signal having a frequency equal to the selected chopper frequency from said automatic frequency selector means so as to automatically ratio control the period of time said first and second electronic switches are on and off.

5. An induction motor drive as recited in claim 3 wherein said first and second electronic switches of said chopper means are each comprised of a first thyristor and a series diode, a second thyristor, a second diode, an inductor, turn off means connected to the junction of said first thyristor and said series diode, and said turn off means being comprised of a capacitor coupling said first thyristor to said second thyristor and said second diode and said inductor in inverse parallel with said second thyristor, and means for unidirectionally charging said capacitor to enable starting said chopper means.

6. An induction motor drive as recited in claim 5 wherein said first and second electronic switches are further comprised of a power resistor grid connected from said turn off means to the opposite D.C. buss potential from that being controlled, said resistor grid connected to said opposite buss potential via a selective electronic switch.

7. An inductive motor drive as recited in claim 5 wherein said turn off means is common to said first and second electronic switches and is comprised of a single turn off network consisting of a single thyristor with an inductor and diode in inverse parallel therewith, the parallel combination being connected in series with a capacitor, said network connected with the turn off thyristor cathode in common with the cathode of the said first thyristor whose anode is connected to the positive buss and the network at its other end being connected to the anode of the said first thyristor whose cathode is connected to the negative buss.

8. An induction motor drive as recited in claim 3 wherein said second and fourth discharge path means are comprised of a single second discharge path for said first and second inductive coils to allow said first and second inductive coils to continue to supply said inverter with current when said first and second electronic switches are in the off state, said single discharge path consisting of a single thyristor whose cathode is connected to the inductive coil associated with the electronic switch connected to said positive buss and whose anode is connected to the inductive coil associated with the electronic switch connected to said negative buss.

9. An induction motor drive as recited in claim 3 wherein said first discharge path means consists of a first thyristor connected in parallel with said first inductive coil with the anode of said first thyristor connected in common with the common anode side of said inverter, and said third discharge path means consists of a second thyristor connected in parallel with said second inductive coil connected to the common cathode side of said inverter.

10. An induction motor drive as recited in claim 9 wherein said first and second inductive coils are wound on a common core and tightly coupled to a mutual field thereby, and said second discharge path means of said first inductive coil consists of said second electronic switch, one of said clamp diodes, and one of said inverter thyristor switches, the discharge through said second discharge path means occurring by virtue of all ampere turns being carried by said second inductive coil when said first inductive coil is starved for current by virtue of said first electronic switch being off and said first discharge path means for said first inductive coil being disabled, said fourth discharge path means of said second inductive coil consists of said first electronic switch, one of said clamp diodes, and one of said inverter thyristor switches, the discharge through said fourth discharge path means occurring by virtue of all ampere turns being carried by said first inductive coil when said second inductive coil is starved for current by virtue of said second electronic switch being off and said third discharge path means of said second inductive coil being disabled.

11. A solid state current source, polyphase inverter induction motor drive comprising:
 a. a constant potential D.C. buss including a positive buss and a negative buss;
 b. a self-commutating polyphase inverter comprising a plurality of thyristor switches supplied from said constant potential D.C. buss and providing polyphase driving current at its output, adjacent ones of said plurality of thyristor switches being capacitively coupled;
 c. clamp means including a plurality of clamp diodes connected to the output of said self-commutating polyphase inverter;
 d. first chopper means including a first inductive coil, a first electronic switch connected from said positive buss to one end of said first inductive coil, the other end of which is connected to the common anode side of said self-commutating polyphase inverter, and a first discharge path means for permitting said first inductive coil to continue to supply current to said self-commutating polyphase inverter even when said first electronic switch is in the off state;
 e. second chopper means including a second inductive coil, a second electronic switch connected from said negative buss to one end of said second inductive coil, the other end of which is connected to the common cathode side of said self-commutating polyphase inverter, and a second discharge path means for permitting said second inductive coil to continue to supply current to said self-commutating polyphase inverter even when said second electronic switch is in the off state, said first and second electronic switches switching in unison for varying the ratio of time said first and second inductive coils are connected to said positive and negative buss, respectively, or freewheeling via said first and second discharge paths, respectively.

* * * * *